United States Patent [19]
Janney et al.

[11] Patent Number: 5,885,493
[45] Date of Patent: Mar. 23, 1999

[54] METHOD OF DRYING ARTICLES

[75] Inventors: Mark A. Janney, Knoxville; James O. Kiggans, Jr., Oak Ridge, both of Tenn.

[73] Assignee: Lockheed Martin Energy Research Corporation, OakRidge, Tenn.

[21] Appl. No.: 963,970

[22] Filed: Nov. 4, 1997

[51] Int. Cl.⁶ .............................. B28B 11/00; B29B 17/00
[52] U.S. Cl. ....................... 264/37.18; 264/232; 264/344; 34/329; 34/337
[58] Field of Search ................................. 264/37.18, 37.1, 264/42, 232, 344; 34/329, 337, 338, 356

[56] References Cited

U.S. PATENT DOCUMENTS

| | | | |
|---|---|---|---|
| 2,503,913 | 4/1950 | Kimberlin et al. | 34/9 |
| 2,528,767 | 11/1950 | Marisic . | |
| 3,755,915 | 9/1973 | Nagell | 34/95 |
| 4,113,480 | 9/1978 | Rivers | 75/214 |
| 4,667,417 | 5/1987 | Graser et al. | 34/9 |
| 5,082,607 | 1/1992 | Tange et al. | 264/44 |
| 5,489,353 | 2/1996 | Brungardt | 156/89 |
| 5,680,713 | 10/1997 | Forbert et al. | 34/342 |

*Primary Examiner*—Christopher A. Fiorilla
*Attorney, Agent, or Firm*—Joseph A. Marasco

[57] ABSTRACT

A method of drying a green particulate article includes the steps of:

a. Providing a green article which includes a particulate material and a pore phase material, the pore phase material including a solvent; and b. contacting the green article with a liquid desiccant for a period of time sufficient to remove at least a portion of the solvent from the green article, the pore phase material acting as a semipermeable barrier to allow the solvent to be sorbed into the liquid desiccant, the pore phase material substantially preventing the liquid desiccant from entering the pores.

24 Claims, 3 Drawing Sheets

METHOD OF DRYING ARTICLES

The United States Government has rights in this invention pursuant to contract no. DE-AC05-96OR22464 between the United States Department of Energy and Lockheed Martin Energy Research Corporation.

FIELD OF THE INVENTION

The present invention relates to methods of drying particulate articles, and more particularly to such methods wherein a particulate article is contacted with a liquid desiccant.

BACKGROUND OF THE INVENTION

There are four major steps in manufacturing most ceramic articles, including forming, drying, firing, and finishing. The present invention is applicable to the drying step, which often represents a significant and sometimes heretofore insurmountable problem in ceramic manufacturing.

For example, gelcasting is a useful method for forming complex articles in ceramic and/or metal powders. Drying (removing water or other solvent from) green (freshly cast, wet) gelcast articles is an essential step in the gelcasting manufacturing process.

The present invention is also applicable to other powder forming methods, such as solvent-based injection molding and extrusion. The present invention is not limited to drying green ceramic articles, but is also suitable for drying various other types of particulate articles, as set forth hereinbelow.

Conventional drying methods generally comprise exposing a formed article to air or a selected gas or gas mixture having particular conditions of temperature and humidity that will cause solvent to evaporate from the gelled article and be carried away by the atmosphere surrounding the article.

Some types of articles are difficult to dry properly via conventional drying methods because of solvent gradients therein, resulting in significantly differential drying of various regions thereof which induces structural stresses. For example:

1. Thick articles, especially those having at least a one inch minimum cross section, often crack during drying because the interior dries much more slowly than the surface.
2. Thin plates often curl or warp during drying because one side dries faster than the other.
3. Articles having occluded regions (for example, cones and other closed ended containers, and articles having serpentine internal passageways) are subject to stresses and malformation (warping, cracking, etc.) due to the occluded regions drying much more slowly than the open regions.
4. Articles with sharp edge sections tend to dry and crack in the region of such edges before the bulk of the material can be properly dried.
5. Articles having complex shapes, generally which include a plurality of thick regions, thin regions, sharp edges, and/or occluded regions, etc.

Such drying problems create defects (e.g. cracking, warpage, other malformations) in the dried articles, reducing the value of the articles, and often rendering the article useless.

Further background information can be found in the following patents and publications:

1. U.S. Pat. No. 4,894,194 issued on Jan. 16, 1990 to M. A. Janney entitled "Method for Molding Ceramic Powders."
2. U.S. Pat. No. 5,028,362 issued on Jul. 2, 1991 to M. A. Janney and O. O. Omatete entitled "Method for Molding Ceramic Powders Using a Water-Based Gelcasting."
3. U.S. Pat. No. 5,145,908 issued on Sep. 8, 1992 to M. A. Janney and O. O. Omatete entitled "Method for Molding Ceramic Powders Using a Water-Based Gelcasting Process."
4. A. C. Young, O. O. Omatete, M. A. Janney, and P. A. Menchhofer, "Gelcasting of Alumina," *J. Am. Ceram. Soc.*, 74 [3] 612–18 (1991).
5. O. O. Omatete, M. A. Janney, and R. A. Strehlow, "Gelcasting-A New Ceramic Forming Process," *Am. Ceram. Soc. Bull.*, 70 [10] 1641–49 (1991).
6. O. O. Omatete, T. N. Tiegs, and A. C. Young, "Gelcast Reaction-Bonded Silicon Nitride Composites," *Ceram. Ens. Sci. Proc.*, 12 [7–8] 1257–64 (1991).
7. O. O. Omatete, A. Bleier, C. G. Westmoreland, and A. C. Young, "Gelcast Zirconia-Alumina Composites," *Ceram. Eng. Sci. Proc.*, 12 [9–10] 2084–94 (1991).
8. Fanelli, A. J., et al. in "New aqueous injection molding process for ceramic powders", *J. Am. Ceram. Soc.*, 72, 1833–43 (1989)
9. Rivers, R. D., Method of injection molding powder metal parts, U.S. Pat. No. 4,113,480 issued Sep. 12, 1978.
10. Mark A. Janney, "Extrusion and Injection Molding," Chapter 7 in *Ceramic Processing*, Terpstra, Pels, and DeVries, eds., Elsevier, Amsterdam, 1995.

The following are incorporated herein by reference:

1. M. A. Janney and C. A. Walls, "Gelcasting compositions having improved drying characteristics and machinability," pending U.S. patent application Ser. No. 08/931,809, filed Sep. 16, 1997.
2. Claudia A. H. Walls, Mark A, Janney, and Glen H. Kirby, "Gelcasting compositions and methods," U.S. patent application Ser. No. 08/931,809, filed Sep. 16, 1997 now abandoned.

OBJECTS OF THE INVENTION

Accordingly, it is an object of the present invention to provide a method of uniformly drying green gelcast and other types of green particulate articles.

It is another object of the present invention to provide a method of drying green gelcast and other types of green particulate articles without imparting differential drying induced stresses.

It is a further object of the present invention to provide a method of drying green gelcast and other types of green particulate articles without cracking or warping.

Further and other objects of the present invention will become apparent from the description contained herein.

SUMMARY OF THE INVENTION

In accordance with one aspect of the present invention, the foregoing and other objects are achieved by a method of drying a green particulate article which includes the steps of: (a) Providing a green article which includes a particulate material and a pore phase material, the pore phase material including a solvent; and (b) contacting the green article with a liquid desiccant.

In accordance with another aspect of the present invention, a method of drying a green particulate article includes the steps of: (a) Providing a green article which includes a particulate material and a pore phase material, the pore phase material including a solvent; and (b) contacting the green article with a liquid desiccant for a period of time sufficient to remove at least a portion of the solvent from the green article, the pore phase material acting as a semipermeable barrier to allow the solvent to be sorbed into the liquid desiccant, the pore phase material substantially preventing the liquid desiccant from entering the pores.

For a better understanding of the present invention, together with other and further objects, advantages and capabilities thereof, reference is made to the following disclosure and appended claims in connection with the above-described drawings.

DETAILED DESCRIPTION OF THE INVENTION

The subject method for drying green particulate articles involves bringing a green particulate/binder article, especially those made by a forming process such as gelcasting, extrusion and solvent-based injection molding, into contact with an appropriate liquid desiccant, often by immersion therein. A liquid desiccant is defined as a liquid which has a sufficient osmotic affinity for the solvent used in the forming process to sorb at least a portion of the solvent out of the article, but does not significantly infiltrate the article. Use of a liquid desiccant has several unexpected advantages. For example:

1. The liquid desiccant can be brought into contact with all of the surfaces of the article to be dried, providing a more uniform drying medium in comparison with conventional air drying techniques wherein uniform exposure of all surfaces to air is very difficult.

2. The pore phase material (binder) which holds the particles together acts as a semipermeable barrier, which allows the solvent to flow out of the pores (out of the pore phase material) and into the liquid desiccant, but substantially prevents the liquid desiccant from entering the pores (the pore phase material). Thus, the pore phase-liquid desiccant interface is substantially and unexpectedly different from a pore phase-air/gas interface.

A similar situation is obtained when the pore phase material is a thermoreversible gel such as that used in some solvent-based injection molding methods, or is a viscous polymer solution used in some methods of extruding particulate articles.

Figure 1:
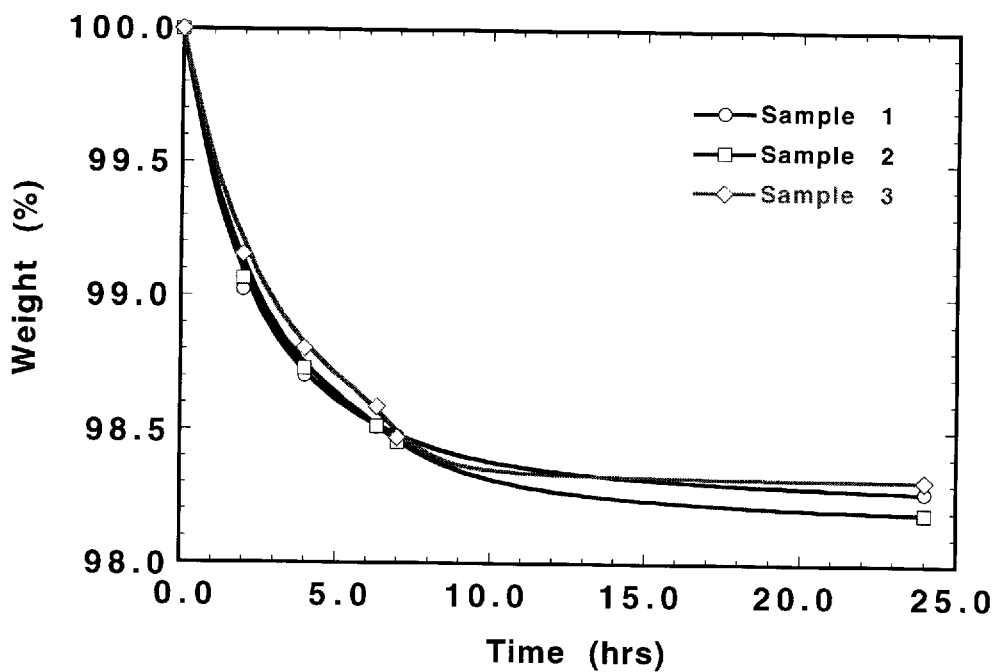
FIG. 1 is a graph showing solvent removal from a gelcast article in accordance with the present invention, in terms of percent initial weight over time.

3. The drying of gelcast articles is self regulating, especially in the initial phase of drying (up to about 25% solvent removal). It is well known in the ceramics art that the most critical phase of drying a ceramic green body is the initial phase. It is in the initial phase of drying that most of the shrinkage associated with drying occurs. As shown in FIG. 1, the gelcast objects lose about 25% to about 30% of the water content thereof (about 1.5 wt. % to about 1.8 wt. %) using the present invention. This assures that no region of the object will be over dried or dried too quickly, which in turn, reduces the stresses developed during drying.

Again, a similar situation obtains when the pore phase material is a thermoreversible gel such as that used in some solvent-based injection molding methods, or is a viscous polymer solution used in some methods of extruding particulate articles.

4. Since the liquid desiccant reaches areas where air is difficult to circulate, the present invention can also speed up the time required to dry a article to the point where shrinkage generally stops, which is the most critical step in drying. After shrinkage is complete, the probability of cracking or distortion is greatly reduced.

5. The water carrying capacity of the liquid desiccant is larger than that for air having a high, controlled relative humidity.

6. The liquid desiccant can provide buoyant support for the article being dried. Such support can be helpful in preventing distortion of the article during drying.

In a preferred embodiment of the present invention, the action of the liquid desiccant on a gelcast article is due to the difference in osmotic pressure between the liquid desiccant and the gelled polymer in the gelcast article. The presence of a polymer or other material which acts as a semipermeable barrier in the pore phase of the green article is critical to the operation of the invention. If a gelcast article were simply an ordinary porous ceramic, for example, as in a slip cast article, the liquid desiccant would not simply draw water out of the body; it would also tend to diffuse into the pore space of the ceramic because of the difference in concentration between the liquid desiccant bath and the pore space of the ceramic. Hence, there would be little real removal of liquid from the article; one liquid (the liquid desiccant) would simply displace another (the original solvent in the pore space.)

In gelcast articles, the diffusion of the liquid desiccant into the article is significantly retarded or eliminated by the presence of the polymer gel. The gel acts as a semipermeable barrier which allows water to diffuse readily out of the gelcast article, but does not allow the liquid desiccant to diffuse into the gelcast article.

It can thus be seen that the liquid desiccant should have a relatively high molecular weight to act as an appropriate desiccant. For example, an aqueous solution of a simple salt such as sodium chloride or ammonium chloride would not be appropriate for use as an liquid desiccant; the salt would diffuse into the gelcast article. The liquid desiccant should preferably either not diffuse into the gelled article at all, or should at least diffuse into the article at a rate sufficiently lower than the diffusion rate of solvent out of the gelled article in order to realize the objects and advantages of the present invention.

The pore phase of a particulate article suitable for drying in accordance with the present invention can comprise a great variety of components such as polymer gels, polymer solutions, and other pore phase materials which will function as described herein.

Examples of suitable polymer gels include gels produced by vinyl polymerization of monomers, gels produced by condensation polymerization of monomers, gels produced from solutions of naturally occurring polymers, and gels produced from solutions of synthetic polymers.

Examples of suitable polymer gels produced by vinyl polymerization of monomers include gels made by polymerizing monofunctional and multifunctional vinyl monomers and gels made by polymerizing multifunctional vinyl monomers. A particular example is a gel made by polymerizing hydroxymethylacrylamide and a water-soluble comonomer in water.

Examples of suitable polymer gels produced by condensation polymerization of monomers include epoxies, urethanes, phenolics, furans, and melamines.

Examples of suitable polymer gels produced from solution of naturally occurring polymers include polysaccharides such as agar, xanthan gum, starch, and locust bean gum, and proteins such as gelatin and albumin.

Examples of suitable polymer gels produced from solutions of a synthetic polymers include cellulose derivatives, poly (vinyl alcohol), poly (acrylic acid), and poly (acrylamide).

Examples of suitable polymer solutions include a polymer such as: poly (vinyl alcohol), poly (acrylic acid), poly (acrylamide), poly (ethylene oxide), poly (ethylene imine), poly (alkylacrylates), poly (vinyl butyrals), cellulose derivatives, poly (vinyl pyrrollidone), starch, modified starch, polystyrene; and at least one solvent such as water, an alcohol, an ether, a ketone, a glycol ether, a hydrocarbon, or a halogenated hydrocarbon.

Suitable liquid desiccants for many aqueous gelcast, solvent-based injection molded, and/or extruded particulate articles include, but are not limited to: polyethylene glycol (PEG) of various molecular weights (e.g. PEG200, PEG400, PEG600, PEG800); polypropylene glycol (PPG) of various molecular weights; polyols; solutions of polymers such as dextrans, cellulose derivatives such as methylcellulose, poly (vinyl alcohol), poly (ethylene imine), polystyrene, poly (acrylamide) acrylics, and polyesters; and various blends thereof.

The present invention is also suitable for drying particulate articles made using non-aqueous solvents. Examples of non-aqueous solvents include: an alcohol (ethanol, methanol, butanol, etc), a ketone (acetone, methyl ethyl ketone, etc.), an ether, a glycol ether, a hydrocarbon, a halogenated hydrocarbon, other organic solvents, and blends thereof.

The present invention is especially useful for green particulate articles which contain volatile solvents (e.g. acetone) because drying via a liquid desiccant controllably retards the drying process, allowing the article to dry more uniformly.

Suitable liquid desiccants for particulate articles made with and containing a non-aqueous solvent include, but are not limited to: PEG of various molecular weights, PPG of various molecular weights, polyols, various oils ( e.g., mineral, vegetable, and/or animal oils), and solutions of polymers in non-aqueous solvents. In cases where a mixture of solvents is used, it is possible to preferentially remove one or more solvent components from an article and leave the other solvent component(s) behind by using a liquid desiccant which has a high affinity for the selected solvent component(s) and a low affinity for the non-selected solvent component(s).

For both aqueous and non-aqueous systems, the liquid desiccant is generally in the liquid state as it is contacted with the article. Liquid desiccants that are normally solids at processing temperatures are generally applied to the present invention as concentrated solutions thereof, but can be applied in solid form, as described hereinbelow. The solvent used is generally the same solvent as is to be removed from the green particulate article, or another solvent miscible therewith. The concentration of the desiccant will affect the rate of solvent removal and also the total solvent removal.

However, the liquid desiccant can actually be in the solid particulate state as it is contacted with the green particulate article. The solid particulate dissolves and liquifies upon sorption of solvent from the green particulate article. Hence, the term "liquid desiccant" is to be construed to include any desiccant which can be in the solid particulate state as it is contacted with a green particulate article, and which dissolves and liquifies upon sorption of solvent from the green particulate article. In this way, a higher solvent removal rate and greater total solvent removal can be achieved than with a pre-dissolved desiccant in solution because the undiluted desiccant will exert a higher osmotic pressure than it would if pre-dissolved. For example, dry PEG1000 powder can be packed around a green particulate article in a suitable vessel. As the PEG1000 absorbs the solvent, it dissolves therein and liquifies, producing the same or similar results as would PEG1000 if it were added as a concentrated solution.

The present invention is also suitable for drying any other green ceramic, metal, or other porous particulate articles, such as those made by extrusion or solvent-based injection molding, wherein the pores of the green particulate body are occupied by a material having an osmotic pressure which is lower than the osmotic pressure of a liquid desiccant, and which acts as a semipermeable barrier. A suitable liquid desiccant will remove solvent from the pores of the article while the semipermeable barrier substantially prevents the liquid desiccant from entering pores of the article.

The present invention is useful for drying articles made by other particulate forming processes if the pore phase has an appropriate polymer content. For example, the present invention is useful for drying extruded ceramic or other particulate articles made using methylcellulose or other high polymers in solution as the vehicle to impart plasticity of the particulate mass or for aqueous injection molded articles.

A simple test can be performed to determine whether or not a prospective liquid is a suitable liquid desiccant for a particular green particulate article.

EXAMPLE I

Several identical hydrogel samples in the shape of small ¾" cubes were prepared comprising 20 wt.% hydroxymethylacrylamide in water, polymerized using ammonium persulfate and tetramethylethylenediamine.

Green hydrogel samples were weighed, immersed at room temperature in three liquids, identified hereinbelow, being tested as liquid desiccants for 16 hour, and weighed again.

In polyethyleneglycol, 400 molecular weight (PEG400), the gel sample lost 22% of its original green weight, showing PEG400 to be an excellent liquid desiccant. In saturated NaCl, the gel gained 25% of its original green weight, and in saturated sucrose the gel gained 58% of its original green weight. Obviously, neither the sucrose nor the NaCl solutions are suitable desiccants for the hydrogel tested.

EXAMPLE II

Green gelcast articles of various shapes were prepared in accordance with conventional gelcasting methods in order to test the invention. A conventional gelcasting suspension comprising the following materials was prepared:

| | |
|---|---|
| Ceramic powder | Aluminum Oxide 1000 g |
| Solvent | Water 167 g |
| Dispersant | Darvan 821-A 10 g |

| | |
|---|---|
| Monofunctional monomer | Methacrylamide (MAM) 22 g |
| Difunctional monomer | PEG1000 dimethacrylate 7 g |

The suspension was conventionally processed by mixing in a ball mill with aluminum oxide grinding media (3/8" diameter balls), at a loading of 500 g grinding media to 1000 g alumina powder. After mixing, the suspension was removed from the mill and conventionally de-aired under vacuum.

In accordance with conventional gelcasting methods, tetramethylethylenediamine (TEMED) and ammonium persulfate were added at the rate of 1.0 μl 10% APS solution and 0.1 μl TEMED per gram alumina suspension to initiate the gelation reaction. The suspension was then poured into various molds to form articles described in succeeding examples set forth hereinbelow. The molds were placed in an oven to gel for 30 minutes at 50° C., and allowed to cool to ambient. The resulting green articles were then ready for drying in accordance with the present invention.

EXAMPLE III

Thick plates measuring about 4"×4"×1" were cast as described hereinabove in Example I. One of the plates was conventionally dried in air at room temperature and humidity for about 48 hours in order to provide comparative data.

Other plates were dried in accordance with the present invention by immersion in a container of PEG400 at room temperature for 24 hours. Samples were tested during the drying process. Drying curves of three samples are shown in FIG. 1. At the end of this time, the plates were removed from the PEG400 and rinsed under running water. This was followed by drying in ambient air for 24 hours so that total drying times were similar to that of the sample dried in air.

The article dried entirely in air was cracked in the dry state and cracked further upon conventional firing to full density at 1550° C. The articles dried using the solvent drying process followed by air drying did not crack either during drying or during firing at 1550° C.

EXAMPLE IV

Thin-walled cones measuring 1/8" in wall thickness, 9" in height, and 3" diameter at base were cast, as described hereinabove in Example I, in aluminum molds with aluminum mandrels. After gelation, however, the mandrels were removed and the articles were left in the mold to dry in order to retain the precise shape thereof. (Removal of such articles from the molds immediately upon gelation resulted in severe malformation of the articles due to the highly flexible state thereof immediately upon gelation.)

One of the cones was conventionally dried by allowing the water to evaporate from the cone at ambient temperature and humidity for a period of 24 hours. At the end of that time, most of the cone was dry and rigid. However, the lower one inch of the cone was still very green and flexible, and malformed upon removal from the mold.

Another cone was dried in accordance with the present invention by filling the cavity of the cone with PEG400 and letting it sit in the cone for 1 hour to sorb solvent therefrom. The PEG400 was then drained from the cavity and the article was removed from the mold. At this point, the article was hard and firm throughout its length. There was no flexibility to the article at all. It was allowed to dry at ambient conditions for an additional 24 hours.

After drying, the cones were densified by conventional firing. The article dried according to the present invention densified normally and did not crack. The article dried conventionally densified abnormally, with cracking and malformation.

EXAMPLE V

Further experiments were conducted as described hereinabove in Example III with the exception that PEG of different molecular weight was used as a liquid desiccant. PEG200, PEG600 and various blends of PEG200, PEG400, and PEG600 were found to be suitable liquid desiccants for carrying out the present invention.

EXAMPLE VI

Experiments are conducted as described hereinabove in Example V with the exception that PEG1000 in powder form is used as the liquid desiccant, and is packed around the green article. As the powder sorbs the solvent, the PEG dissolves therein and liquifies.

EXAMPLE VII

Thin plates measuring 8"×8"×1/8" were gelcast as described in Example I hereinabove. One plate was conventionally dried in carefully controlled humidity conditions on a screen fixture which raised the plate up off the drying cabinet floor about 1 inch to allow air to circulate. Drying conditions were: 2 days at 92% relative humidity; 2 days at 75% relative humidity; and 2 days at ambient room conditions. The plate curled badly during drying, taking on a malformed concave shape.

Another plate was dried in accordance with the present invention by immersion in a bath of PEG400, laying on a bed of 1/2 inch diameter beads in the bottom of the bath to allow flow of PEG400 under the plate in order to sorb solvent from all available surfaces. After 1 hour in the PEG400 bath, the article was removed, rinsed under running water to remove excess PEG400, and allowed to dry an additional 24 hours at ambient conditions. The plate was completely flat after this treatment, and showed no cracks.

After drying, the plates were densified by conventional firing. The article dried according to the present invention densified normally and did not crack. The article that had been dried conventionally densified abnormally, with cracking and malformation.

EXAMPLE VII

A gelcast article in the form of a thin-walled crucible measuring 1/8" in wall thickness, 1" in height, and 6" in diameter was cast as described in Example I in an aluminum mold with an aluminum mandrel. The crucible was quite rubbery when removed from the mold. The crucible was dried in accordance with the present invention by immersion in a container of PEG400 such that the crucible was completely covered with PEG400. After 40 minutes, the crucible was removed from the PEG400 bath. The crucible was quite stiff at this point, although it still contained a significant amount of water. The crucible was then rinsed under water to remove the excess PEG400 and allowed to air dry overnight at ambient conditions. No cracking or distortion of the crucible was observed after drying.

After drying, the crucible was densified by conventional firing. The crucible densified normally and did not crack.

The examples presented hereinabove are directed toward a typical alumina gelcasting composition. The present invention, however, is suitable for use with any gelcast particulate article, or any particulate article made by any solvent based forming method.

EXAMPLE IX

An aqueous injection molding mix was made by mixing together the following ingredients to form a pourable suspension:

| | |
|---|---|
| Ceramic powder | Alumina (3 micrometer diameter) 100 g |
| Porous phase | 3 wt % agar solution in water 30 g |
| Dispersant | citric acid 1 g |

The ingredients were mixed together at about 60° C. (a temperature at which the agar solution is fluid). Then, the suspension was cast into a cylindrical mold of dimensions 2.25 inch diameter by 1 inch tall. After casting, the article was allowed to cool to ambient temperature to gel the part. This example was carried out in accordance with a method outlined by Fanelli, et al. in Ref. 8 listed hereinabove.

Figure 2:
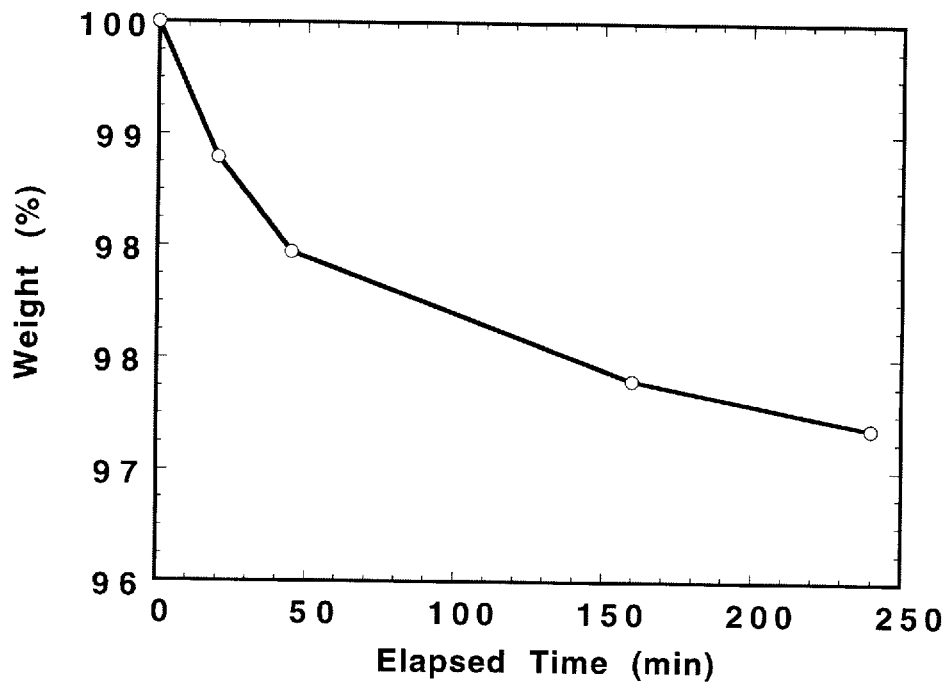
FIG. 2 is a graph showing solvent removal from an aqueous injection molded article in accordance with the present invention, in terms of percent initial weight over time.

After the article was cool, it was immersed in PEG400 to dry. The drying weight loss curve is shown in FIG. 2. The article dried quite rapidly in the PEG400 liquid desiccant. Once the weight stabilized in the PEG400, the article was rinsed under water then allowed to dry at ambient conditions for 24 hours. The article did not warp or crack during drying.

EXAMPLE X

A ceramic article is fabricated using an alcohol-based gelcasting suspension comprising the following:

| | |
|---|---|
| Ceramic powder | Silicon nitride 300 g (volume about 93 ml) |
| Dispersant | Polyvinyl pyrrollidone 40% in isopropyl alcohol 7.5 ml |
| Solvent/monomer | Isopropyl alcohol monomer solution containing 20 wt %, 3:1 methacrylamide/PEG1000 dimethacrylate 120 ml |
| Initiator | Azobis isobutyronitrile 10% in isopropyl alcohol 5 ml |

A 40 vol % slurry of silicon nitride powder is made by ball milling the above described ingredients. The slurry is molded into a turbine shape, after which the slurry is heated to 50° C. for 2 hours to gel the slurry into a green article. The green article is cooled to ambient temperature and is then removed from the mold. The green article is subsequently immersed in PEG400 for about 1 hour to remove about 20% of the solvent from the article. The article is then removed from the liquid desiccant, rinsed under alcohol to remove the excess liquid desiccant, then air dried to remove the residual isopropyl alcohol.

EXAMPLE XI

A ceramic article is fabricated using a propylene glycol methylether-based gelcasting system comprising the following:

| | |
|---|---|
| Ceramic powder | Silicon nitride 1000 g (about 310 ml) |
| Dispersant | Solsperse 20,000 (product of ICI, Americas, Wilmington, DL) 20 g (about 20 ml) |
| Solvent/monomer | Propylene glycol methyl ether monomer solution containing 20 wt %, 3:1 methacrylamide/PEG1000 dimethacrylate, 427 ml |
| Initiator | Azobis isobutyronitrile 10% solution in propylene glycol methyl ether, 17.5 ml |

A 40 vol % slurry of silicon nitride powder is made by ball milling the above described ingredients. The slurry is molded into a turbine shape, after which the slurry is heated to 50° C. for 2 hours to gel the slurry into a green article. The green article is cooled to ambient temperature and is then removed from the mold. The green article is subsequently immersed in PEG400 for about 1 hour to remove about 20% of the solvent from the article. The article is then removed from the liquid desiccant, rinsed under alcohol to remove the excess liquid desiccant, then air dried to remove the residual isopropyl alcohol.

EXAMPLE XII

A ceramic article is fabricated using a water-based extrusion system comprising the following:

Ceramic powder—Aluminum oxide 1000 g (about 251 ml)

Polymer solution—water and 10 wt % methylcellulose 252 ml

A 50 vol % extrusion mix of the above materials is prepared in a high shear mixer such as a sigma blade mixer. The extrusion mix is formed into shape by extrusion through a die. After extrusion, the article is immersed for an appropriate time in PEG400 which sorbs a portion of the aqueous solvent. The article is then removed from the PEG400, rinsed under water to remove the excess PEG400, then air dried to remove the residual water.

The examples presented hereinabove are directed toward a method that is usually conducted at ambient temperature, generally about 15° to 25° C. The present invention, however, is suitable for use over a range of temperatures from the freezing point of the solvent used for forming the article to the boiling point thereof, for example, 0° C. to 100° C. for water-based ceramic forming.

Figure 3:
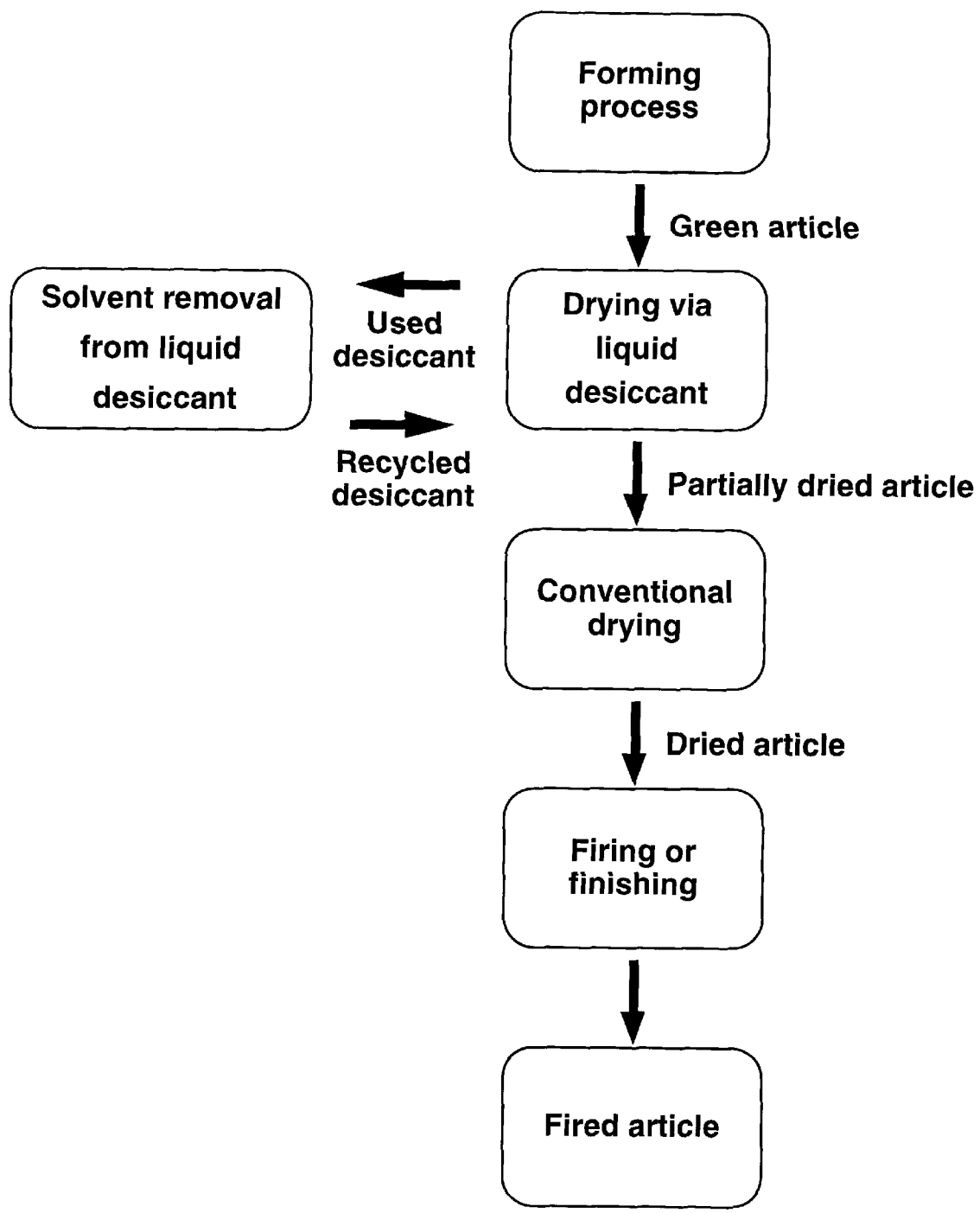
FIG. 3 is a flow chart showing a method of drying a gelcast article including use and recycle of a liquid desiccant in accordance with the present invention.

A system in which the liquid desiccant is regenerated so that it can be reused is shown in FIG. 3. Following use as described hereinabove, the liquid desiccant is loaded with the solvent used for forming the article. The solvent can be removed therefrom via distillation, desiccant drying, ion exchange, or other conventional method of drying such liquids. The regenerated solvent can then be reused.

While there has been shown and described what are at present considered the preferred embodiments of the invention, it will be obvious to those skilled in the art that various changes and modifications can be made therein without departing from the scope of the inventions defined by the appended claims.

What is claimed is:

1. A method of drying a green particulate article comprising the steps of:

a. forming into a preselected shape a green article comprising a particulate material and a pore phase material, said pore phase material comprising a solvent; and b. contacting said green article with a liquid desiccant to remove at least a portion of said solvent from said green article to produce an at least partially dried article which conforms to said preselected shape.

2. A method as defined in claim 1 wherein said contacting step is carried out for a preselected period of time.

3. A method as defined in claim 1 wherein said pore phase material further comprises a semipermeable barrier to allow said solvent to be sorbed into said liquid desiccant, said pore phase material substantially preventing said liquid desiccant from entering said porous phase material.

4. A method as defined in claim 1 wherein said pore phase material further comprises a polymer gel.

5. A method as defined in claim 4 wherein said polymer gel comprises at least one of the group consisting of a gel produced by vinyl polymerization of at least one monomer, a gel produced by condensation polymerization of at least one monomer, a gel produced from a solution of at least one naturally occurring polymer, and a gel produced from a solution of at least one synthetic polymer.

6. A method as defined in claim 5 wherein said gel produced by vinyl polymerization of monomers comprises at least one of the group consisting of: a gel made by polymerizing at least one monofunctional vinyl monomer and at least one multifunctional vinyl monomer, a gel made by polymerizing at least one multifunctional vinyl monomer, and a gel made by polymerizing hydroxymethylacrylamide and a water-soluble comonomer in water.

7. A method as defined in claim 5 wherein said gel produced by condensation polymerization of a monomer comprises at least one polymer system selected from the group consisting of epoxies, urethanes, phenolics, furans, and melamines.

8. A method as defined in claim 5 wherein said gel produced from a solution of a naturally occurring polymer comprises at least one polysaccharide.

9. A method as defined in claim 8 wherein said polysaccharide is selected from the group consisting of agar, xanthan gum, starch, and locust bean gum.

10. A method as defined in claim 5 wherein said gel produced from a solution of a naturally occurring polymer comprises at least one protein.

11. A method as defined in claim 10 wherein said protein is selected from the group consisting of gelatin and albumin.

12. A method as defined in claim 5 wherein said gel produced from a solution of a synthetic polymer comprises at least one of the group consisting of a cellulose derivative, poly (vinyl alcohol), poly (acrylic acid), and poly (acrylamide).

13. A method as described in claim 1, wherein said pore phase material further comprises a polymer solution.

14. A method as described in claim 13, wherein said polymer solution comprises: at least one polymer selected from the group consisting of poly (vinyl alcohol), poly (acrylic acid), poly (acrylamide), poly (ethylene oxide), poly (ethylene imine), poly (alkylacrylates), poly (vinyl butyrals), a cellulose derivative, poly (vinyl pyrrollidone), starch, modified starch, polystyrene; and at least one solvent selected from the group consisting of water, an alcohol, an ether, a ketone, a glycol ether, a hydrocarbon, and a halogenated hydrocarbon.

15. A method as defined in claim 1, wherein said liquid desiccant comprises at least one of the group consisting of: a PEG; a PPG; a polyol; and a solution of at least one polymer in a solvent, said polymer being selected from the group consisting of dextran, a cellulose derivative, poly (vinyl alcohol), poly (ethylene imine), polystyrene, poly (acrylamide), an acrylic, and a polyester.

16. A method as defined in claim 15 wherein said PEG comprises PEG200, PEG400, PEG600, PEG800, and PEG1000.

17. A method as defined in claim 15 wherein said liquid desiccant comprises PEG1000.

18. A method as defined in claim 1 further comprising the additional step of:

c. rinsing residual liquid desiccant from said particulate article.

19. A method as defined in claim 1 further comprising the additional step of:

c. further drying said particulate article.

20. A method as defined in claim 1 further comprising the additional step of:

c. regenerating said liquid desiccant by removing said solvent therefrom.

21. A method as defined in claim 1 wherein said liquid desiccant buoyantly supports said particulate article.

22. A method of drying a green particulate article comprising the steps of:

a. Providing a green article comprising a particulate material and a pore phase material, said pore phase material comprising a solvent; and b. contacting said green article with a liquid desiccant for a period of time sufficient to remove at least a portion of said solvent from said green article, said pore phase material acting as a semipermeable barrier to allow said solvent to be sorbed into said liquid desiccant, said pore phase material substantially preventing said liquid desiccant from entering said pores.

23. A method of drying a green particulate article comprising the steps of:

a. forming into a preselected shape a green article comprising a particulate material and a pore phase material, said pore phase material comprising a solvent; and b. contacting said green article with a desiccant to remove at least a portion of said solvent from said green article to produce an at least partially dried article which conforms to said preselected shape, said desiccant being applied as a solid which dissolves in said solvent.

24. A method as defined in claim 23 wherein said desiccant comprises PEG 1000.

\* \* \* \* \*